No. 755,143. Patented March 22, 1904.

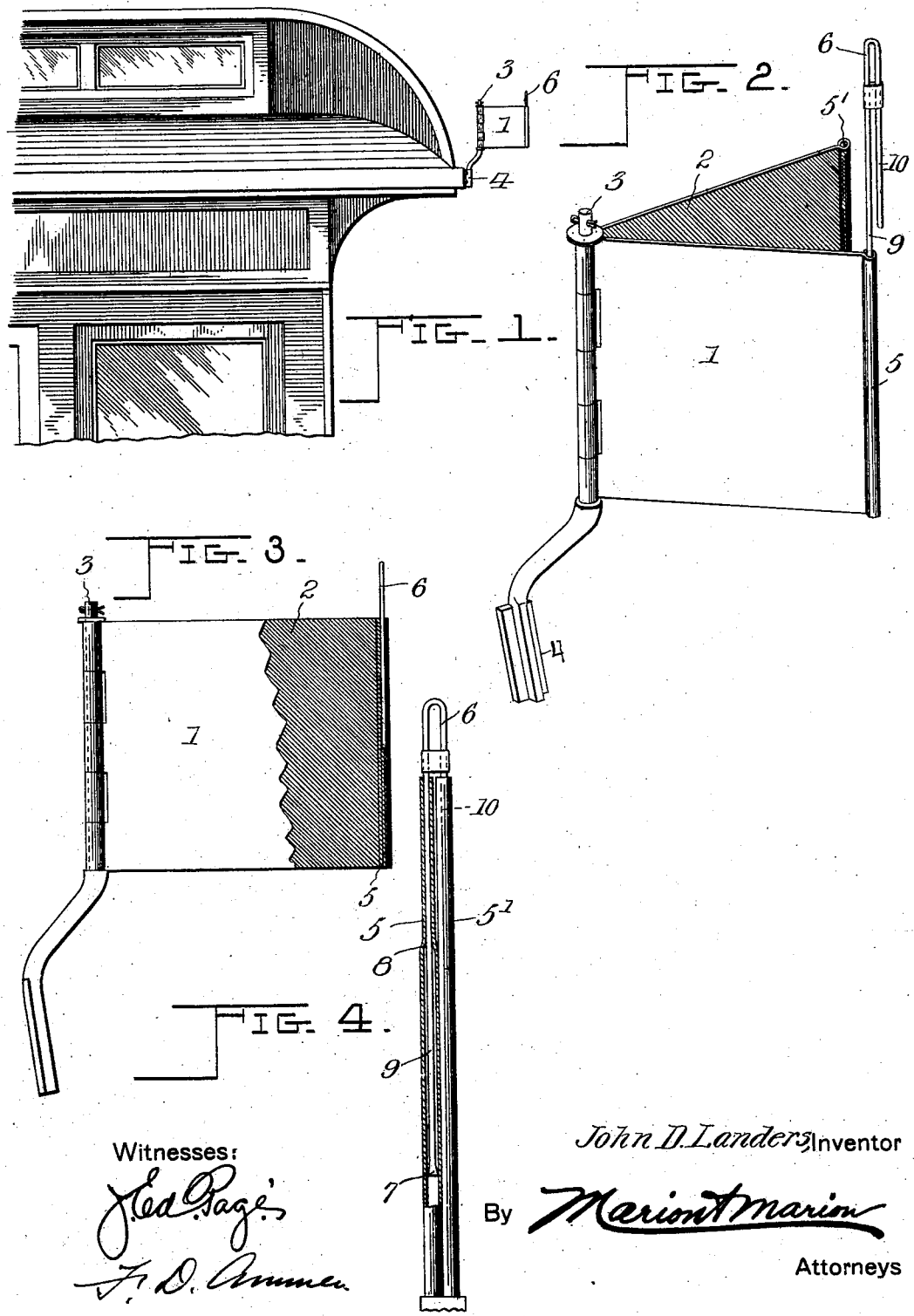

UNITED STATES PATENT OFFICE.

JOHN D. LANDERS, OF WINNIPEG, CANADA.

TRAIN-SIGNAL.

SPECIFICATION forming part of Letters Patent No. 755,143, dated March 22, 1904.

Application filed September 10, 1903. Serial No. 172,575. (No model.)

*To all whom it may concern:*

Be it known that I, JOHN D. LANDERS, residing at Winnipeg, in the county of Selkirk, in the Province of Manitoba, in the Dominion of Canada, have invented certain new and useful Improvements in Train-Signals; and I do hereby declare that the following is a full, clear, and exact description of the invention, such as will enable others skilled in the art to which it appertains to make and use the same.

My invention has for its object the provision of an improved form of train signal-flag.

As is well known, in the use of an ordinary signal-flag composed of colored woven fabric the action of rain, smoke, and dust soon discolors the flag to a considerable extent, rendering the color dull and the flag dirty, so that it is sometimes difficult to distinguish a dirty white flag from a green one. According to my invention, however, the flags are preferably constructed of sheet metal—such as tin, sheet-iron, zinc, &c.—and the colors are applied by means of paint, which may be renewed whenever desired, thereby securing at all times a bright signal.

In the drawings which accompany this specification, Figure 1 is a side elevation of the upper portion of one end of a car, showing one form of my invention attached thereto. Fig. 2 is a perspective view of a signal-flag embodying my invention. Fig. 3 is a side elevation of the same, one of the leaves being partly broken away. Fig. 4 is an edge view, partly in section, of the flag of Figs. 2 and 3, illustrating more clearly the means for securing the leaves together.

The same numerals of reference indicate like parts in all views of the drawings.

The signal-flags in all cases, as previously stated, are preferably composed of metal, to which the colors may be applied whenever desired, although it is obvious that other materials having sufficient rigidity may be used.

In the form shown in Figs. 1 to 4 the signal-flag comprises a pair of leaves 1 2, hinged together upon the supporting-rod 3, the lower portion of said rod being adapted for insertion in a socket 4 of any approved form. The free edges of the leaves 1 and 2 are adapted to be secured together when the signal is in use, thereby exposing only the outer faces of the leaves 1 and 2. These outer faces should be of the same color. The inner faces of the leaves in the position shown in Fig. 2 are also of the same color, which is a different color from that of their exterior faces. For example, the exterior faces may be colored white and the interior faces green. When the edges of the leaves are secured together in the position shown in Fig. 3, the signal will be a white flag. Upon opening the leaves and turning them upon the hinge, so that the white faces of the leaves are together, the green faces will be exposed, and the signal becomes a green flag. In this manner I am able to dispense with half the usual number of flags, since each signal can be used in place of two of the ordinary train-flags. The free edges of the leaves 1 and 2 may be secured together in any suitable manner. In the form shown the edges of the leaves are formed into loops 5 5', into which are inserted end portions 9 10 of a bent wire or rod 6. The end portion 9 is provided with a shoulder or stop 7, which is adapted to abut against the shoulder 8, formed in the loop 5, and prevent the complete withdrawal of the securing-rod. The end portion 10 of the rod 6 is of such length that it may be entirely withdrawn from the loop 5' while the other end portion is held in its corresponding loop, as shown in Fig. 2.

Having thus described my invention, what I claim, and desire to secure by Letters Patent, is—

A signal-flag comprising a pair of hinged leaves, loops formed at the free edges of said leaves, and a locking wire or rod having its end portions bent into parallelism and inserted within said loops, one of said loops and end portions having shoulders or stops to prevent the complete withdrawal of said rod.

In witness whereof I have hereunto set my hand in the presence of two witnesses.

JOHN D. LANDERS.

Witnesses:
E. E. HARDY,
I. S. STACKPOOLE.